United States Patent Office 3,501,266
Patented Mar. 17, 1970

3,501,266
METHOD OF SEPARATING POTASSIUM HALATES FROM POTASSIUM HALIDES BY ADDITION OF AMMONIA
Remigius A. Gaska and Robert D. Goodenough, Midland, Mich., assignors to The Dow Chemical Company, Midland, Mich., a corporation of Delaware
No Drawing. Continuation-in-part of application Ser. No. 541,058, Apr. 8, 1966. This application Nov. 5, 1968, Ser. No. 773,624
Int. Cl. C01d 3/14, 3/16
U.S. Cl. 23—89
4 Claims

ABSTRACT OF THE DISCLOSURE

This invention relates to a method of separating potassium halate salts from aqueous solutions containing potassium halide salts by adding sufficient ammonia to precipitate, selectively, the potassium halate salt and separating the precipitate from the purified potassium halide solution.

This application is a continuation-in-part of Ser. No. 541,058, filed Apr. 8, 1966, now U.S. Patent 3,429,668.

BACKGROUND OF THE INVENTION

In the manufacture of potassium halides considerable potassium halate may also be present as an impurity. For example, in reacting an aqueous solution of potassium carbonate with hydrogen bromide to form potassium bromide, potassium bromate is also formed.

Prior to this invention, potassium halates were separated from the corresponding halides by concentrating aqueous solutions until they were substantially saturated with the halide. The precipitate of the potassium halate, which forms on cooling the aqueous solution, is either contaminated with a considerable amount of halide salt or if the halate salt precipitate is comparatively pure, a fairly large amount of the halate salt remains in solution. To make a satisfactory halate salt requires either recrystallization of the contaminated product or low initial recovery because of excessive loss in the mother liquor.

Therefore, a primary object of the present invention is to provide a method of effectively separating potassium halates from potassium halides.

THE INVENTION

According to this invention, liquid or gaseous ammonia or aqueous $NH_4OH$ is added to an aqueous mixture of a potassium halate and potassium halide. In fact, it is not necessary to have the combined salts in solution, but rather, a solid composition may be used in the process. The amount of $NH_3$ added can range between 10–50% by weight of the combined weight of $NH_3$ and water. The preferred range is from about 15–30% ammonia by weight of the combined weight of $NH_3$ and water. The potassium halate can all be in solution or some of it can be present as a precipitate. It is preferred to have the aqueous solution near its saturation point in regard to potassium halate.

Gaseous or liquid $NH_3$ is preferred over aqueous $NH_4OH$ because of the ease with which the most desirable concentration in the system is attained and the avoidance of the dilution effect of aqueous $NH_4OH$.

Preferably a temperature of 0–100° C. is employed. More preferably a temperature of 15–30° C. is used, because no external heating or cooling is needed in this operating range.

Pressure has no effect on the results obtained. It is a function only of the temperature and $NH_3$ concentration used in precipitating the potassium halate.

The salt pairs that can be separated are:

| KCl | $KClO_3$ |
| KBr | $KBrO_3$ |
| KI  | $KIO_3$ |

The $NH_3$ can be readily recovered from the mother liquor and recycled to the precipitation system. The residual mother liquor from the $NH_3$ distillation can then be further evaporated and the halide recovered by crystallization.

In the event a superpure halide product is desired, the rendered halate can be passed through a reducing system and converted to the halide.

Although the invention is described by reference to batch operation, it is apparent that it can be readily adapted to a continuous system by use of known metering devices for controlling proportions of liquid or gaseous $NH_3$ or aqueous $NH_4OH$ and aqueous potassium halate-halide solutions that are fed to a continuous separator system.

The example which follows is intended to illustrate but not to limit the invention. In all instances, parts and percentages are given by weight unless otherwise specifically indicated.

EXAMPLE

To an aqueous solution containing 2 parts $KClO_3$ and 14.5 parts KCl was added sufficient gaseous $NH_3$ to provide a concentration of 17.5% by weight $NH_3$, based on the combined weight of water and $NH_3$. The temperature of the mixture was held at 20° C. until equilibrium conditions were established. The $KClO_3$ crystals were filtered from the mixture and the filtrate analyzed 14% KCl and 0.5% $KClO_3$ on an ammonia-free basis.

In a similar manner potassium bromate-bromide and potassium iodate-iodide solutions can be admixed with ammonia in accordance with the present invention to precipitate potassium bromide or potassium iodide.

Moreover, the method of the present invention can be used in connection with an overall process for preparing potassium halates. For example, $K_2CO_3$, KOH, or $KHCO_3$ in aqueous solution is reacted with HBr to form KBr. Depending upon the basic reagent used, further reaction products include $KBrO_3$, $CO_2$ and $H_2O$. Such aqueous solutions of KBr containing the $KBrO_3$ impurity are then admixed with ammonia in sufficient amount to precipitate a substantial amount of the potassium bromate, which is separated from the purified KBr solution. Likewise other hydrogen halides can be reacted with the potassium salts to produce a potassium halide solution, provided the system does not reach the point of acidic decomposition of the halate, that can be purified with ammonia addition.

The method of the present invention having thus been fully described, various modifications thereof will be at once apparent.

What is claimed is:
1. A method of separating potassium halates selected from the group consisting of $KClO_3$, $KBrO_3$ and $KIO_3$ from the corresponding potassium halides selected from the group consisting of KCl, KBr and KI comprising: admixing an aqueous solution containing said halates and said halides with an amount of $NH_3$ within the concentration range of from about 10 to about 50 weight percent based on the combined weight of water and $NH_3$ sufficient to precipitate the potassium halate and separating said precipitate.

2. The method of claim 1 wherein the temperature during the precipitation step ranges from about 0 to about 100° C.

3. A method of preparing purified potassium halide selected from the group consisting of KCl, KBr and KI which comprises:
  (a) reacting an aqueous solution of a member selected from the group consisting of potassium hydroxide, potassium bicarbonate and potassium carbonate with a hydrogen halide selected from the group consisting of HCl, HBr and HI, thereby obtaining an aqueous potassium halide solution containing a potassium halate impurity,
  (b) admixing the reacted solution with an amount of $NH_3$ within the concentration range of from about 10 to about 50 weight percent based on the combined weight of water and $NH_3$ sufficient to precipitate the potassium halate,
  (c) separating said precipitate, thereby obtaining a purified solution of potassium halide.

4. The method of claim 3 wherein the hydrogen halide is HBr.

References Cited

UNITED STATES PATENTS

| | | | |
|---|---|---|---|
| 765,417 | 7/1904 | Dow | 23—85 X |
| 1,392,905 | 10/1921 | Barstow | 23—85 X |
| 1,505,078 | 8/1924 | Dolbear | 23—312 |
| 1,510,046 | 9/1924 | Dolbear | 23—296 |

FOREIGN PATENTS 23,109  6/1930  Netherlands.

OTHER REFERENCES

Isbin, J. Amer. Chem. Soc., March 1945, vol. 67, pp. 464 to 465.

NORMAN YUDKOFF, Primary Examiner

S. J. EMERY, Assistant Examiner

U.S. Cl. X.R.

23—85, 300, 302